(12) United States Patent
Nakagawa et al.

(10) Patent No.: US 10,611,351 B2
(45) Date of Patent: Apr. 7, 2020

(54) VEHICULAR DRIVING ASSISTANCE DEVICE

(71) Applicants: ADVICS CO., LTD., Kariya-shi, Aichi-ken (JP); TOYOTA JIDOSHA KABUSHIKI KAISHA, Toyoto-shi, Aichi-ken (JP)

(72) Inventors: Yusuke Nakagawa, Nagoya (JP); Yasuhito Ishida, Toyokawa (JP); Akitsugu Sakai, Toyota (JP)

(73) Assignees: ADVICS CO., LTD., Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 258 days.

(21) Appl. No.: 15/558,070

(22) PCT Filed: Feb. 25, 2016

(86) PCT No.: PCT/JP2016/055666
§ 371 (c)(1),
(2) Date: Sep. 13, 2017

(87) PCT Pub. No.: WO2016/158115
PCT Pub. Date: Oct. 6, 2016

(65) Prior Publication Data
US 2018/0079397 A1    Mar. 22, 2018

(30) Foreign Application Priority Data
Mar. 31, 2015   (JP) .................................. 2015-073282

(51) Int. Cl.
*B60T 8/32*     (2006.01)
*B60T 8/17*     (2006.01)
(Continued)

(52) U.S. Cl.
CPC ................... *B60T 8/32* (2013.01); *B60T 7/12* (2013.01); *B60T 7/122* (2013.01); *B60T 8/17* (2013.01);
(Continued)

(58) Field of Classification Search
CPC . B60T 8/32; B60T 7/122; B60T 8/245; B60T 8/172; B60T 7/12; B60T 8/17; B60T 2260/09; B60T 2201/02; B60T 2201/04
See application file for complete search history.

(56) References Cited

U.S. PATENT DOCUMENTS

2007/0222289 A1*  9/2007  Fukuda ................. B60T 8/1766
                                                          303/192
2008/0189021 A1*  8/2008  Inoue ................... B60K 31/047
                                                          701/93
(Continued)

FOREIGN PATENT DOCUMENTS

JP    60-142033 A    7/1985
JP     8-2294 A      1/1996
(Continued)

OTHER PUBLICATIONS

International Search Report (PCT/ISA/210) dated May 17, 2016, by the Japanese Patent Office as the International Searching Authority for International Application No. PCT/JP2016/055666.
(Continued)

*Primary Examiner* — Alan D Hutchinson
(74) *Attorney, Agent, or Firm* — Buchanan Ingersoll & Rooney PC (57) ABSTRACT

When an engine speed is less than a safeguard speed while a vehicle downhill assist control is being executed, a target speed of the vehicle downhill assist control is increased. In addition, if the target speed is greater than a vehicle speed, braking force applied to the vehicle is decreased.

7 Claims, 4 Drawing Sheets

(51) Int. Cl.
*B60T 7/12* (2006.01)
*B60T 8/172* (2006.01)
*B60T 8/24* (2006.01)

(52) U.S. Cl.
CPC .............. *B60T 8/172* (2013.01); *B60T 8/245* (2013.01); *B60T 2201/02* (2013.01); *B60T 2201/04* (2013.01); *B60T 2260/09* (2013.01)

(56) References Cited

U.S. PATENT DOCUMENTS

2011/0297462 A1* 12/2011 Grajkowski ........... B60K 26/04
180/54.1
2016/0200300 A1* 7/2016 Ishida .................... B60T 8/175
701/83

FOREIGN PATENT DOCUMENTS

| | | |
|---|---|---|
| JP | H-10-507145 A | 7/1998 |
| JP | 2003-94985 A | 4/2003 |
| JP | 2009-120059 A | 6/2009 |
| WO | WO 96/11826 A1 | 4/1996 |

OTHER PUBLICATIONS

Written Opinion (PCT/ISA/237) dated May 17, 2016, by the Japanese Patent Office as the International Searching Authority for International Application No. PCT/JP2016/055666.
International Preliminary Report on Patentability (Form PCT/IB/373) and English translation of the Written Opinion (Forms PCT/ISA/237), dated Oct. 3, 2017, by the International Bureau of WIPO in corresponding International Application No. PCT/JP2016/055666. (4 pages).

* cited by examiner

VEHICULAR DRIVING ASSISTANCE DEVICE

TECHNICAL FIELD

The present invention relates to a vehicle driving assistance device.

BACKGROUND ART

Patent Document 1 discloses a driving assistance device that executes a vehicle downhill assist control. The vehicle downhill assist control is one example of the driving assistance control that operates the brake system of a vehicle to adjust the braking force applied to the vehicle such that the vehicle speed does not exceed a target speed. The vehicle downhill assist control is started if the vehicle speed reaches a value greater than or equal to an initiating speed so that an initiating requirement is satisfied in the condition in which a manually-operated activation switch is on.

In the device disclosed in Patent Document 1, if the driver manipulates the accelerator pedal during execution of the vehicle downhill assist control, the device increases the target speed as the manipulation amount of the accelerator pedal is increased. If the target speed becomes greater than the vehicle speed, the device reduces the braking force applied to the vehicle by the operation of the brake system.

Vehicles that do not include a torque converter on the power transmission path from the engine to the wheels include, for example, vehicles that have a manual transmission. In such a vehicle, when braking force is applied to the wheels by executing the vehicle downhill assist control, the load applied to the engine is increased, and the engine speed may be decreased. Such decrease in the engine speed that accompanies executing the vehicle downhill assist control is significant when the gear position of the transmission is in a high-speed gear position.

Such a phenomenon is not limited to the vehicle with the manual transmission, but may similarly occur in a vehicle that does not include the torque converter on the power transmission path as described above.

PRIOR ART DOCUMENT

Patent Document

Patent Document 1: Japanese National Phase Laid-Open Patent Publication No. 10-507145

SUMMARY OF THE INVENTION

Problems that the Invention is to Solve

Accordingly, it is an objective of the present invention to provide a vehicle driving assistance device that restrains reduction of the engine speed when braking force is being applied to wheels by execution of a driving assistance control.

Means for Solving the Problems

To achieve the foregoing objective, a vehicle driving assistance device that includes a braking controller and a target speed setting section is provided. The braking controller executes a driving assistance control, in the driving assistance control. If a vehicle speed is greater than a target speed, the braking controller increases braking force applied to a vehicle. If the vehicle speed is less than the target speed, the braking controller decreases the braking force applied to the vehicle. If an engine speed is less than a safeguard speed during execution of the driving assistance control by the braking controller, the target speed setting section increases the target speed.

With the above configuration, in the condition in which braking force is being applied to the wheels through the execution of the driving assistance control, the target speed of the driving assistance control is increased if the engine speed is less than the safeguard speed. If the target speed becomes greater than the vehicle speed, the braking force applied to the wheels is decreased to make the vehicle speed approach the target speed. Thus, the load applied to the engine is reduced, and the engine speed is consequently increased. This restrains the decrease in the engine speed while the braking force is being applied to the wheels through the execution of the driving assistance control.

In a state in which the engine speed is very low, the engine speed is further reduced by applying the braking force to the wheels through the execution of the driving assistance control. Thus, in this case, to restrain a further decrease in the engine speed, the braking force applied to the vehicle is preferably reduced at an early stage so that the engine speed is increased at an early stage. However, in a state in which the engine speed is relatively high although the engine speed is less than the safeguard speed, the engine speed is unlikely to be extremely reduced even if the braking force is being applied to the wheels through the execution of the driving assistance control. Thus, the braking force applied to the vehicle may be slowly reduced to restrain an excessive increase in the vehicle speed.

In this regard, in the above-described vehicle driving assistance device, a determination value that is less than the safeguard speed may be set to a gradient switching speed, in addition to the safeguard speed. If the engine speed is less than the gradient switching speed during execution of the driving assistance control by the braking controller, the target speed setting section preferably increases the target speed at a first gradient. If the engine speed is greater than or equal to the gradient switching speed and less than the safeguard speed during execution of the driving assistance control by the braking controller, the target speed setting section preferably increases the target speed by a second gradient, which is less than the first gradient.

With the above configuration, it is determined that the engine speed is extremely low if the engine speed is less than the gradient switching speed. Thus, the target speed is increased at the first gradient. In this case, since the difference obtained by subtracting the vehicle speed from the target speed is likely to be increased, the braking force applied to the vehicle is promptly reduced. As a result, the engine speed is increased at an early stage. If the engine speed is greater than or equal to the gradient switching speed and less than the safeguard speed, it is determined that the engine speed is relatively high. Thus, the target speed is increased at the second gradient, which is less than the first gradient. In this case, compared with a case in which the target speed is increased at the first gradient, the braking force applied to the vehicle is gently reduced since the difference obtained by subtracting the vehicle speed from the target speed is unlikely to be increased. As a result, the vehicle speed is restrained from being excessively increased during execution of the driving assistance control. Thus, during execution of the driving assistance control, a decrease in the engine speed and an excessive increase in the vehicle speed are both restrained.

It is not desirable for the vehicle speed to be excessively increased during execution of the driving assistance control. Thus, the above-described vehicle driving assistance device is preferably configured such that, if the engine speed is greater than or equal to the safeguard speed during execution of the driving assistance control by the braking controller, the target speed setting section maintains the target speed. With this configuration, the target speed is maintained if the engine speed becomes greater than or equal to the safeguard speed. If the target speed becomes equal to the vehicle speed, the braking force applied to the vehicle is maintained. Thus, an unnecessary increase in the vehicle speed during execution of the driving assistance control is restrained.

As described above, the engine speed may continue to be increased in some cases although the target speed is maintained and the braking force applied to the vehicle is maintained since the engine speed became greater than or equal to the safeguard speed. If the engine speed is high, the engine speed is unlikely to be extremely low although the braking force applied to the vehicle is increased. In the above-described vehicle driving assistance device, a determination value greater than the safeguard speed may be set to a decrease determination speed. If the engine speed is greater than or equal to the decrease determination speed during execution of the driving assistance control by the braking controller, the target speed setting section preferably decreases the target speed toward a reference speed.

With the above configuration, if the engine speed becomes greater than or equal to the decrease determination speed, and the target speed is decreased, the target speed becomes less than the vehicle speed. This increases the braking force applied to the vehicle such that the vehicle speed approaches the target speed, and the vehicle speed is gradually decreased. Thus, the vehicle speed approaches the reference speed within the range in which the engine speed does not become extremely low.

The state in which driving force is not transmitted from the engine of the vehicle to the wheels although the engine is operated is referred to as a neutral state. If the vehicle is in the neutral state, it is not desirable for the vehicle speed to be changed since there is a possibility that a driver performs a manipulation for switching the gear position of the transmission. Thus, in the above-described The vehicle driving assistance device is preferably configured such that a state in which driving force is not transmitted from an engine of a vehicle to wheels during operation of the engine is defined as a neutral state. If the neutral state is detected when the engine speed is greater than or equal to the safeguard speed during execution of the driving assistance control by the braking controller, the target speed setting section preferably maintains the target speed.

In the case in which the engine speed is greater than or equal to the safeguard speed, the engine speed is relatively high although the braking force applied to the vehicle is not decreased. Thus, the engine speed is unlikely to be extremely low. For this reason, in the above-described configuration, the target speed is maintained if the neutral state is detected in the condition in which the engine speed is greater than or equal to the safeguard speed. This causes the vehicle speed to be equal to the target speed, and the braking force applied to the vehicle is maintained. As a result, the vehicle speed is unlikely to fluctuate. Thus, while the vehicle is in the neutral state, the driver is allowed to calmly perform a manipulation such as the manipulation for switching the gear position of the transmission.

When the vehicle is in the neutral state, the engine speed is unlikely to be extremely low although the braking force applied to the vehicle is great. Thus, in the neutral state, even if the engine speed is less than the safeguard speed, the target speed does not necessarily have to be increased. However, if a malfunction or a failure occurs in the sensors for detecting that the vehicle is in the neutral state, the vehicle may be erroneously detected to be in the neutral state although the vehicle is not actually in the neutral state. In this case, unless the target speed is set to be greater than the vehicle speed, the braking force applied to the vehicle is not decreased, and the engine speed may possibly be reduced.

Thus, in the above-described vehicle driving assistance device, if the engine speed is less than the safeguard speed during execution of the driving assistance control by the braking controller, the target speed setting section preferably increases the target speed regardless of whether the vehicle is in the neutral state. For example, in the condition in which the engine speed is less than the safeguard speed, a malfunction or a failure may occur in the sensors for detecting that the vehicle is in the neutral state, and the vehicle may be erroneously detected to be in the neutral state although the vehicle is not actually in the neutral state. In this respect, with this configuration, the target speed is increased in the above-described cases also. Thus, the target speed is set to be greater than the vehicle speed, and the braking force applied to the vehicle is decreased. As a result, the engine speed is maintained to be high, and the engine speed is restrained from being extremely low.

Although the target speed during execution of the driving assistance control is changed in accordance with the engine speed as described above, engine stall may occur due to a mistake in the manipulation performed by the driver. Thus, in the above-described vehicle driving assistance device, if engine stall occurs during execution of the driving assistance control by the braking controller, the target speed setting section preferably maintains the target speed.

With the above configuration, if engine stall occurs during execution of the driving assistance control, the target speed is maintained regardless of the level of the engine speed at that time. Thus, the vehicle speed becomes equal to the target speed, and the braking force applied to the vehicle is maintained. As a result, since the vehicle speed is not increased, the driver is allowed to calmly perform the manipulation for starting the engine.

MODES FOR CARRYING OUT THE INVENTION

A vehicle driving assistance device according to one embodiment will now be described with reference to FIGS. 1 to 4.

Figure 1:
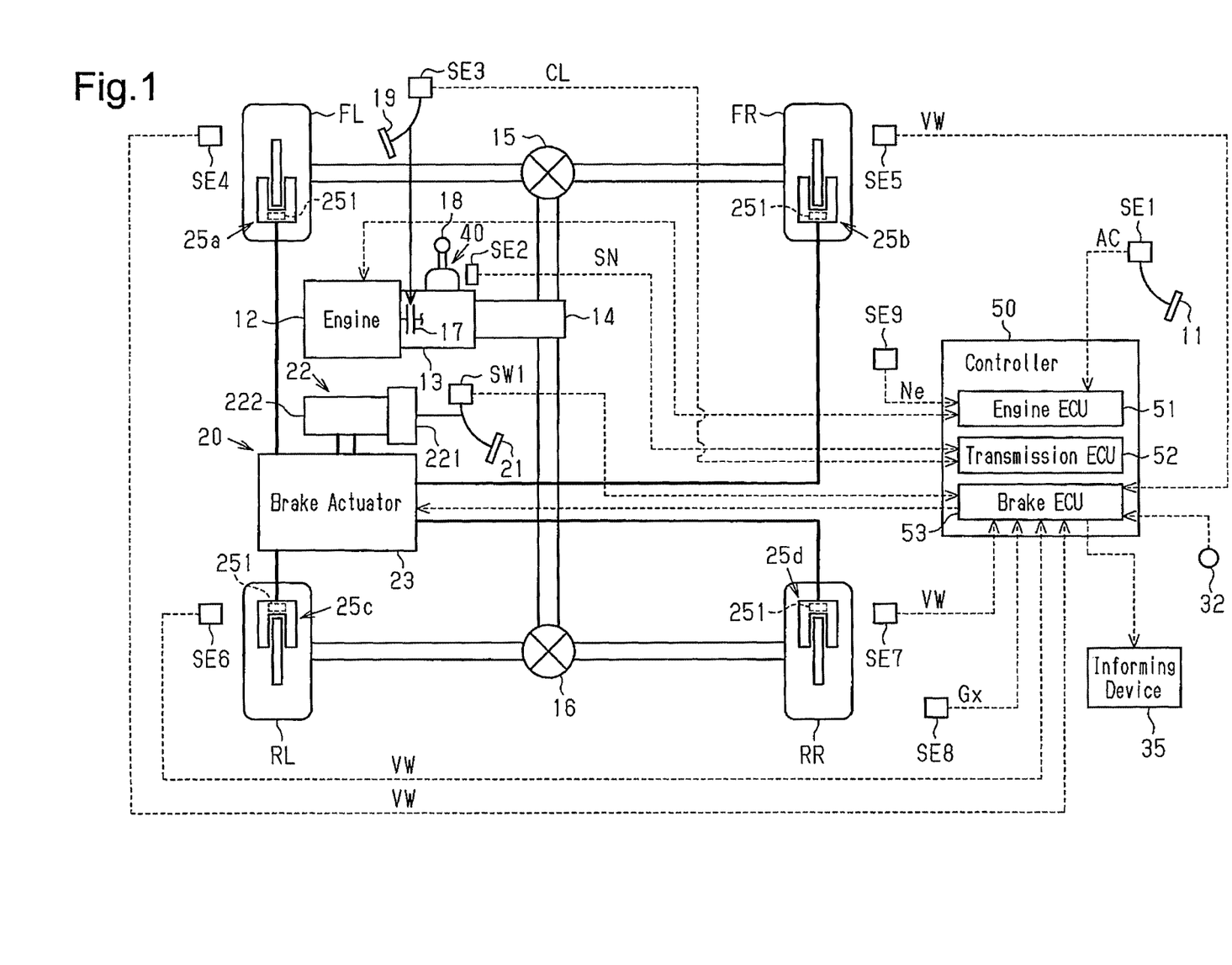
FIG. 1 is a schematic diagram of a vehicle equipped with a controller of a vehicle driving assistance device according to one embodiment.

FIG. 1 illustrates a vehicle equipped with a controller 50. The controller 50 is the vehicle driving assistance device according to the present embodiment. As shown in FIG. 1, the vehicle is a four-wheel drive vehicle, in which a front left wheel FL, a front right wheel FR, a rear left wheel RL, and a rear right wheel RR function as drive wheels.

The vehicle includes an engine 12. The engine 12 outputs driving force in accordance with the manipulation amount of an accelerator pedal 11 by a driver. The driving force output from the engine 12 is transmitted to a transfer case 14 via a transmission 13. The driving force distributed to the front wheels by the transfer case 14 is transmitted to the front wheels FL, FR via a front wheel differential 15, and the driving force distributed to the rear wheels by the transfer case 14 is transmitted to the rear wheels RL, RR via a rear wheel differential 16. In this description, the manipulation of the accelerator pedal 11 by the driver is also referred to as accelerator pedal manipulation.

The above-described transmission 13 is a manual transmission. The driving force from the engine 12 is transmitted to the transmission 13 via a clutch 17. In the transmission 13, the gear position is selected in accordance with the manipulation of a shift lever 18 by the driver. The clutch 17 is operated in accordance with the manipulation of a clutch pedal 19. That is, the greater the manipulation amount of the clutch pedal 19, the lower the power transmission efficiency of the clutch 17 becomes, and the less easily the driving force from the engine 12 is transmitted to the transmission 13.

A brake system 20 of the vehicle includes a hydraulic pressure generator 22 and a brake actuator 23. The hydraulic pressure generator 22 generates the hydraulic pressure corresponding to the manipulation force of a brake pedal 21 by the driver. The brake actuator 23 independently adjusts the braking force applied to each of the wheels FL, FR, RL, and RR. In this description, the manipulation of the brake pedal 21 by the driver is also referred to as braking manipulation.

The hydraulic pressure generator 22 includes a booster 221 and a master cylinder 222. The booster 221 assists the manipulation force of the brake pedal 21 by the driver. The master cylinder 222 generates the hydraulic pressure corresponding to the manipulation force assisted by the booster 221, that is, an MC pressure.

The vehicle also includes brake mechanisms 25a, 25b, 25c, and 25d respectively corresponding to the wheels FL, FR, RL, and RR. The brake mechanisms 25a to 25d each include a wheel cylinder 251. The wheel cylinders 251 apply the braking force corresponding to the hydraulic pressure generated in the wheel cylinders 251, that is, a WC pressure to the wheels FL, FR, RL, and RR. In other words, when the driver is performing the braking manipulation, the amount of brake fluid corresponding to the MC pressure generated in the master cylinder 222 is supplied to the wheel cylinders 251 to increase the WC pressure. When the brake actuator 23 is operated, the WC pressure in the wheel cylinders 251 is adjusted by the brake actuator 23.

The vehicle also includes a manually-operated activation switch 32. The manually-operated activation switch 32 is manipulated when the driver requests execution of a vehicle downhill assist control, which will be discussed below. The activation switch 32 is a switch that is switched on and off by the manipulation of the driver. If an initiating requirement of the vehicle downhill assist control is satisfied in the condition in which the activation switch 32 is on, the vehicle downhill assist control is executed.

The vehicle also includes an informing device 35. The informing device 35 informs the driver of the state of the vehicle. For example, when the vehicle downhill assist control is being executed, the informing device 35 informs the driver that the control is being executed. The informing device 35 includes, for example, a lamp, a speaker, and a display screen of a navigation system.

The vehicle includes a brake switch SW1, an accelerator pedal depression degree sensor SE1, a shift position sensor SE2, a clutch sensor SE3, wheel speed sensors SE4, SE5, SE6, and SE7, a front-rear direction acceleration sensor SE8, and a crank position sensor SE9. The brake switch SW1 detects whether the brake pedal 21 is manipulated. The accelerator pedal depression degree sensor SE1 detects an accelerator pedal depression degree AC. The accelerator pedal depression degree AC corresponds to an accelerator pedal manipulation amount, which is the manipulation amount of the accelerator pedal 11. The shift position sensor SE2 outputs a shift signal SN. The shift signal SN is a signal corresponding to the shift position of the shift lever 18.

The clutch sensor SE3 outputs a clutch signal CL. The clutch signal CL is a signal corresponding to the state of the clutch 17 operated by manipulation of the clutch pedal 19. For example, in a case in which the manipulation amount of the clutch pedal 19 at the point in time when the clutch 17 is partially engaged is set to a determination manipulation amount, the clutch sensor SE3 outputs the clutch signal CL indicating that the power transmission by the clutch 17 is disabled if the manipulation amount of the clutch pedal 19 by the driver is greater than or equal to the determination manipulation amount. In contrast, the clutch sensor SE3 outputs the clutch signal CL indicating that the power transmission by the clutch 17 is enabled if the manipulation amount of the clutch pedal 19 is less than the determination manipulation amount.

The wheel speed sensors SE4 to SE7 are provided on the associated wheels FL, FR, RL, and RR and detect the wheel speed VW of the corresponding wheels. The front-rear direction acceleration sensor SE8 detects a front-rear direction acceleration Gx. The front-rear direction acceleration Gx is the acceleration of the vehicle in the front-rear direction. The crank position sensor SE9 detects an engine speed Ne. The engine speed Ne is the speed of the crankshaft of the engine 12. The information detected by these sensors is input to the controller 50.

The controller 50 includes an engine ECU 51, a transmission ECU 52, and a brake ECU 53. The engine ECU 51 controls the engine 12. The transmission ECU 52 controls the transmission 13. The brake ECU 53 controls the brake actuator 23. The ECUs 51 to 53 are capable of sending and receiving various kinds of information and commands to one another.

The brake ECU 53 constitutes the controller 50, which is one example of the driving assistance device of the vehicle. If the initiating requirement is satisfied in the condition in which the activation switch 32 is on, the brake ECU 53 executes control for assisting the traveling of the vehicle on a descending road. The control is a vehicle downhill assist control, such as DAC. DAC is an abbreviation of downhill assist control. In this respect, the vehicle downhill assist control is one example of the driving assistance control, and the brake ECU 53 configures one example of a braking controller.

The initiating requirement of the vehicle downhill assist control includes that the vehicle speed VS is greater than or equal to an initiating speed VSTh.

The vehicle downhill assist control is the control for adjusting a braking force BP applied to the vehicle by operating the brake actuator 23 such that the vehicle speed VS does not exceed a target speed VS_T, which is set to a low speed. That is, when the initiating requirement of the vehicle downhill assist control is satisfied, the target speed VS_T is changed to approach a reference speed VSB (for example, 5 km/h), which is determined in accordance with the accelerator pedal manipulation and the braking manipulation by the driver. That is, when the accelerator pedal manipulation is performed, the reference speed VSB is increased. When the braking manipulation is performed, the reference speed VSB is decreased. A target braking force BP_T is determined such that the vehicle speed VS will be a speed corresponding to the target speed VS_T. More specifically, the target braking force BP_T is reduced if the target speed VS_T is greater than the vehicle speed VS. The target braking force BP_T is increased if the target speed VS_T is less than the vehicle speed VS. In this case, the brake actuator 23 is controlled such that the braking force BP applied to the vehicle approaches the target braking force BP_T. The vehicle speed VS is restrained from being excessive through the execution of the vehicle downhill assist control. Thus, the driver is allowed to concentrate on manipulation of the steering wheel.

The vehicle downhill assist control described above can be executed in cases other than when the vehicle is traveling on the descending road. For example, when the vehicle travels on a road with a low coefficient of friction such as on an icy road surface, the execution of the vehicle downhill assist control assists the manipulation of the vehicle by the driver in a suitable manner.

Next, the shifter that includes the shift lever 18 manipulated by the driver will be described with reference to FIGS. 2A and 2B. The transmission 13 described in this description is, for example, a five forward and one reverse manual transmission.

Figure 2A:
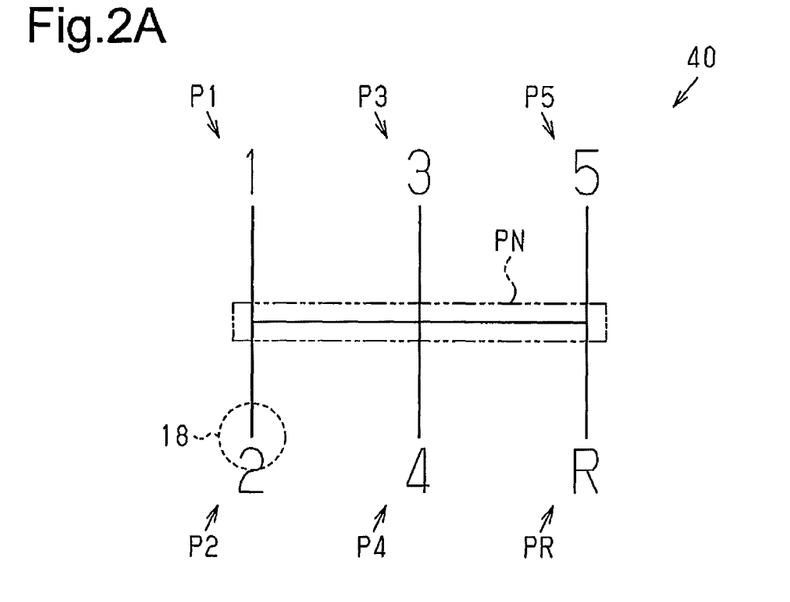
FIG. 2A is a schematic diagram illustrating the configuration of a shifter mounted on the vehicle.

As shown in FIG. 2A, a shifter 40 includes shift positions P1, P2, P3, P4, P5, and PR for the gear positions. The shifter 40 also includes a neutral position PN. The neutral position PN is the shift position for disconnecting power transmission from the engine 12 to the wheels FR, FL, RR, and RL. For example, when the shift lever 18 is located at a second-speed shift position P2, the transmission 13 selects a second-speed gear position and permits power transmission from the engine 12 to the wheels FR, FL, RR, and RL. When the shift lever 18 is located at the neutral position PN, the transmission 13 does not select any gear position and disconnects power transmission from the engine 12 to the wheels FR, FL, RR, and RL.

Figure 2B:
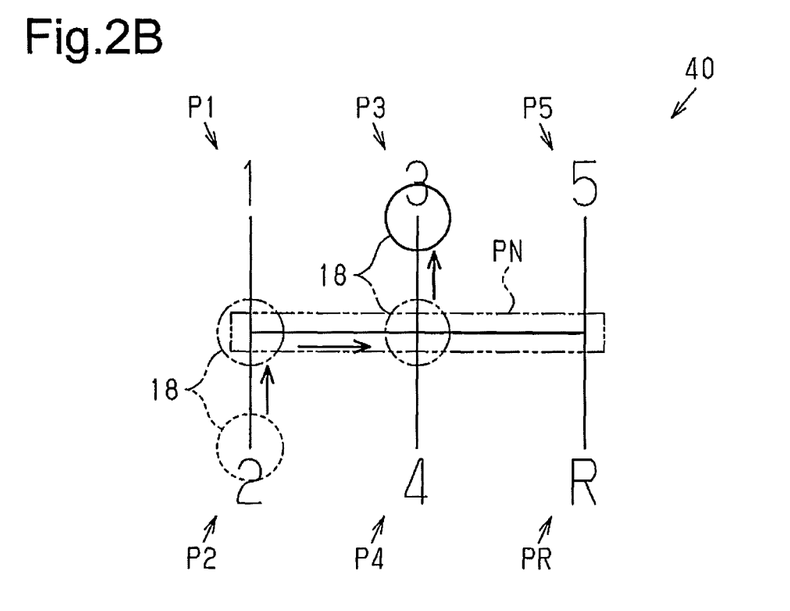
FIG. 2B is an operation diagram illustrating one example of a manner in which the shift lever of the shifter is manipulated.

FIG. 2B shows the movement of the shift lever 18 when the gear position is changed from the second-speed gear position to the third-speed gear position. As shown in FIG. 2B, when the gear position selected by the transmission 13 is to be changed, the shift lever 18 needs to pass the neutral position PN. That is, when the gear position is changed, the transmission 13 temporarily disconnects power transmission from the engine 12 to the wheels FR, FL, RR, and RL.

The cases in which the power transmission from the engine 12 to the wheels FR, FL, RR, and RL is disconnected include not only the case in which the shift lever 18 is located at the neutral position PN, but also the case in which the clutch 17 is disengaged due to the manipulation of the clutch pedal 19 by the driver. In this description, if at least one of the state in which the shift lever 18 is located at the neutral position PN and the state in which the clutch 17 is disengaged by the manipulation of the clutch pedal 19 is established, the state is referred to as a neutral state, in which driving force is not transmitted from the engine 12 to the wheels FR, FL, RR, or RL although the engine 12 is operating. The neutral state is detected by monitoring the shift signal SN from the shift position sensor SE2 and the clutch signal CL from the clutch sensor SE3.

Next, referring to the flowchart in FIG. 3, the routine executed by the brake ECU 53 when the vehicle downhill assist control is executed in the condition in which neither the accelerator pedal manipulation nor the braking manipulation is being performed will be described. The routine is executed at every predetermined control cycle when the vehicle downhill assist control is executed.

Figure 3:
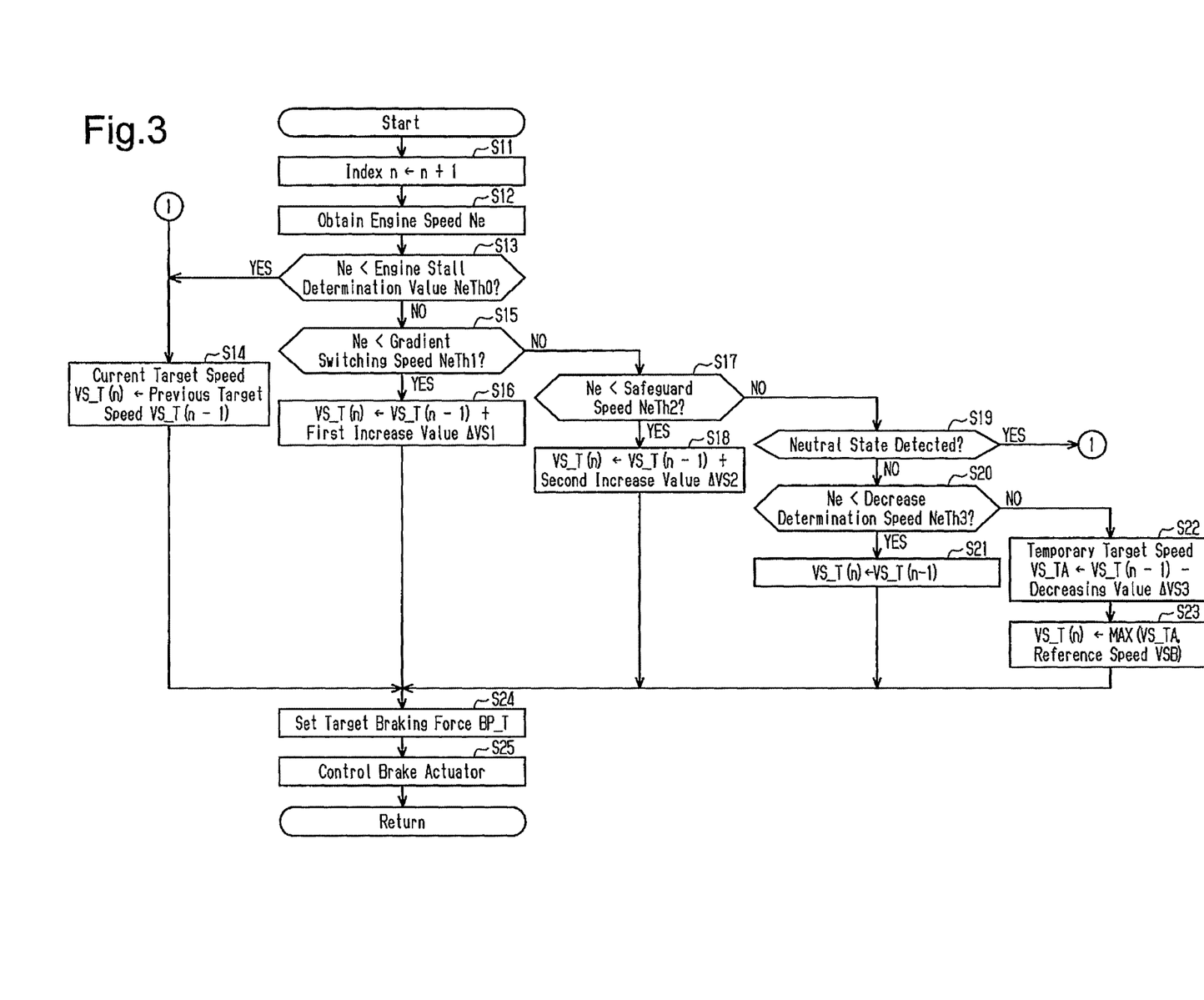
FIG. 3 is a flowchart of a routine executed by the controller, illustrating the routine performed during execution of a driving assistance control.

As shown in FIG. 3, in the routine, the brake ECU 53 increments the index n by one (step S11). The index n is reset to zero when the vehicle downhill assist control is terminated. That is, if the initiating requirement of the vehicle downhill assist control is satisfied and the routine is executed for the first time, the index n is zero.

The brake ECU 53 obtains the engine speed Ne detected by the crank position sensor SE9 (step S12). Subsequently, the brake ECU 53 determines whether the obtained engine speed Ne is less than a predetermined engine stall determination value NeTh0 (step S13). The engine stall determination value NeTh0 is a determination value for determining whether the engine stall has occurred based on the engine speed Ne. That is, if the engine speed Ne is less than the engine stall determination value NeTh0, it is determined that engine stall has occurred, and if the engine speed Ne is greater than or equal to the engine stall determination value NeTh0, it is determined that engine stall has not occurred.

If the engine speed Ne is less than the engine stall determination value NeTh0 (step S13: YES), the brake ECU 53 substitutes a previous target speed VS_T(n−1) into a current target speed VS_T(n) (step S14). The previous target speed VS_T(n−1) is the target speed VS_T that is set when the routine is executed previously. In this respect, if engine stall occurs during execution of the vehicle downhill assist control by the brake ECU 53, the controller 50, which is the driving assistance device according to the present embodiment, configures one example of a target speed setting section for maintaining the target speed VS_T. However, if the index n is one, it is the point in time when the vehicle downhill assist control is started. Thus, when the brake ECU 53 is not executing control, that is, not executing the vehicle downhill assist control, the current target speed VS_T(n) is set to the greater one of the vehicle speed VS at this point in time and the lower limit value of the target speed. Subsequently, the brake ECU 53 proceeds to step S24, which will be discussed below.

In step S13, if the engine speed Ne is greater than or equal to the engine stall determination value NeTh0 (NO), the brake ECU 53 determines whether the engine speed Ne is less than a predetermined gradient switching speed NeTh1 (step S15). The gradient switching speed NeTh1 is set to a value that corresponds to the idle speed of the engine 12 when the idle-up process is not being executed. Thus, if the engine speed Ne is less than the gradient switching speed NeTh1, the engine speed Ne may possibly be extremely reduced by applying the braking force to the wheels FL, FR, RL, and RR.

If the engine speed Ne is less than the gradient switching speed NeTh1 (step S15: YES), the brake ECU 53 sets the current target speed VS_T(n) to the sum (VS_T(n−1)+ ΔVS1) of the previous target speed VS_T(n−1) and a first increase value ΔVS1 (step S16). Subsequently, the brake ECU 53 proceeds to step S24, which will be discussed below.

If the engine speed Ne is greater than or equal to the gradient switching speed NeTh1 (step S15: NO), the brake ECU 53 determines whether the engine speed Ne is less than a predetermined safeguard speed NeTh2 (step S17). The safeguard speed NeTh2 is set to a value greater than the gradient switching speed NeTh1. For example, the safeguard speed NeTh2 is set to a value slightly greater than the idle speed of the engine 12 when the idle-up process is being executed such as in a cold climate or at activation of the compressor. Thus, when the engine speed Ne is greater than or equal to the safeguard speed NeTh2, it is determined that the engine speed Ne is not likely to be extremely low even if the braking force is applied to the wheels FL, FR, RL, and RR. If the engine speed Ne is greater than or equal to the gradient switching speed NeTh1 and less than the safeguard speed NeTh2, the engine speed Ne does not become extremely low at an early stage even if the braking force is applied to the wheels FL, FR, RL, and RR. However, the braking force applied to the wheels FL, FR, RL, and RR is preferably reduced.

For this reason, if the engine speed Ne is greater than or equal to the gradient switching speed NeTh1 and less than the safeguard speed NeTh2 (step S17: YES), the brake ECU 53 sets the current target speed VS_T(n) to the sum (VS_T(n−1)+ΔVS2) of the previous target speed VS_T(n−1) and a second increase value ΔVS2 (step S18). That is, the brake ECU 53, which functions as one example of the target speed setting section, increases the target speed VS_T if the engine speed Ne is less than the safeguard speed NeTh2 during execution of the vehicle downhill assist control. Subsequently, the brake ECU 53 proceeds to step S24, which will be discussed below.

The second increase value ΔVS2 is less than the first increase value ΔVS1. The increase gradient of the target speed VS_T when the engine speed Ne is less than the gradient switching speed NeTh1 will be referred to as a first gradient. Also, the increase gradient of the target speed VS_T when the engine speed Ne is greater than or equal to the gradient switching speed NeTh1 and less than the safeguard speed NeTh2 will be referred to as a second gradient. In this case, the second gradient is less than the first gradient. Thus, if the engine speed Ne is less than the gradient switching speed NeTh1, the target speed VS_T is increased at an early stage. In contrast, if the engine speed Ne is greater than or equal to the gradient switching speed NeTh1 and less than the safeguard speed NeTh2, the target speed VS_T is gently increased.

If the engine speed Ne is greater than or equal to the safeguard speed NeTh2 (step S17: NO), the brake ECU 53 determines whether the vehicle has been detected to be in the neutral state (step S19). If the vehicle has been detected to be in the neutral state (step S19: YES), the brake ECU 53 proceeds to the aforementioned step S14. That is, in a case in which the engine speed Ne is greater than or equal to the safeguard speed NeTh2 during execution of the vehicle downhill assist control, the brake ECU 53 maintains the target speed VS_T if the vehicle is detected to be in the neutral state.

If the vehicle has not been detected to be in the neutral state (step S19: NO), the brake ECU 53 determines whether the engine speed Ne is less than a predetermined decrease determination speed NeTh3 (step S20). The decrease determination speed NeTh3 is set to a value greater than the safeguard speed NeTh2. Thus, if the engine speed Ne is greater than or equal to the decrease determination speed NeTh3, it is determined that the vehicle speed VS is excessively high during execution of the vehicle downhill assist control in the condition in which the accelerator pedal manipulation is not performed. If the engine speed Ne is greater than or equal to the safeguard speed NeTh2 and less than the decrease determination speed NeTh3, it is determined that the engine speed Ne will not be extremely reduced even if the braking force is applied to the vehicle and that the vehicle speed VS is not excessively high although the vehicle downhill assist control is being executed in the condition in which the accelerator pedal manipulation is not performed.

If the engine speed Ne is greater than or equal to the safeguard speed NeTh2 and less than the decrease determination speed NeTh3 (step S20: YES), the brake ECU 53 substitutes the previous target speed VS_T(n−1) into the current target speed VS_T(n) (step S21). That is, if the engine speed Ne is greater than or equal to the safeguard speed NeTh2 and less than the decrease determination speed NeTh3, the brake ECU 53 maintains the target speed VS_T. Subsequently, the brake ECU 53 proceeds to step S24, which will be discussed below.

If the engine speed Ne is greater than or equal to the decrease determination speed NeTh3 (step S20: NO), the brake ECU 53 sets a temporary target speed VS_TA (step S22) to the difference (VS_T(n−1)−ΔVS3) obtained by subtracting a decreasing value ΔVS3 from the previous target speed VS_T(n−1). More specifically, the process for increasing the target speed VS_T in the aforementioned steps S16 and S17 is referred to as an engine stall safeguard process. In this case, if the engine speed Ne is greater than or equal to the decrease determination speed NeTh3 in a state in which the engine stall safeguard process is being executed, the brake ECU 53 calculates the temporary target speed VS_TA based on the previous target speed VS_T(n−1) and the decreasing value ΔVS3. The brake ECU 53 sets the current target speed VS_T(n) to the greater one of the temporary target speed VS_TA and the above-described reference speed VSB (step S23). That is, if the engine speed Ne is greater than or equal to the decrease determination speed NeTh3, the brake ECU 53 reduces the target speed VS_T toward the reference speed VSB. Subsequently, the brake ECU 53 proceeds to the next step S24.

The possibility for the vehicle downhill assist control to be started in the condition in which the engine speed Ne is greater than or equal to the decrease determination speed NeTh3 is significantly low in a case in which the above-described engine stall safeguard process is not being executed, that is, in a case other than the case in which the engine speed Ne is less than the safeguard speed NeTh2 and the target speed VS_T is increased to restrain the decrease in the engine speed Ne. However, there may be a case in which the vehicle downhill assist control is started in the condition in which the engine speed Ne is greater than or equal to the decrease determination speed NeTh3 without the above-described engine stall safeguard process being performed. In this case, the process for decreasing the target speed VS_T, that is, the aforementioned steps S22 and S23 are not executed.

In step S24, the brake ECU 53 sets the target braking force BP_T to a value that is based on the relationship between the current target speed VS_T(n) and the vehicle speed VS at this point in time. That is, if the vehicle speed VS is greater than the current target speed VS_T(n), the target braking force BP_T is increased, and if the vehicle speed VS is less than the current target speed VS_T(n), the target braking force BP_T is reduced. The target braking force BP_T is maintained when the vehicle speed VS is equal to the current target speed VS_T(n). When the vehicle speed VS is less than the current target speed VS_T(n), the greater the difference obtained by subtracting the vehicle speed VS from the current target speed VS_T(n), the greater becomes the decreasing amount of the target braking force BP_T. The brake ECU 53 controls operation of the brake actuator 23 such that the braking force applied to the vehicle approaches the target braking force BP_T (step S25). That is, in the condition in which the vehicle downhill assist control is being executed, the brake ECU 53 increases the braking force applied to the vehicle if the vehicle speed VS is greater than the target speed VS_T, and the brake ECU 53 decreases the braking force applied to the vehicle if the vehicle speed VS is less than the target speed VS_T. If the vehicle speed VS is equal to the target speed VS_T, the brake ECU 53 maintains the braking force applied to the vehicle. Subsequently, the brake ECU 53 temporarily suspends the routine.

Next, referring to the timing diagram shown in FIG. 4, the operation when the vehicle downhill assist control is executed after starting of the vehicle will be described. It is assumed that the accelerator pedal manipulation and the braking manipulation are not performed after the starting of the vehicle.

Figure 4:
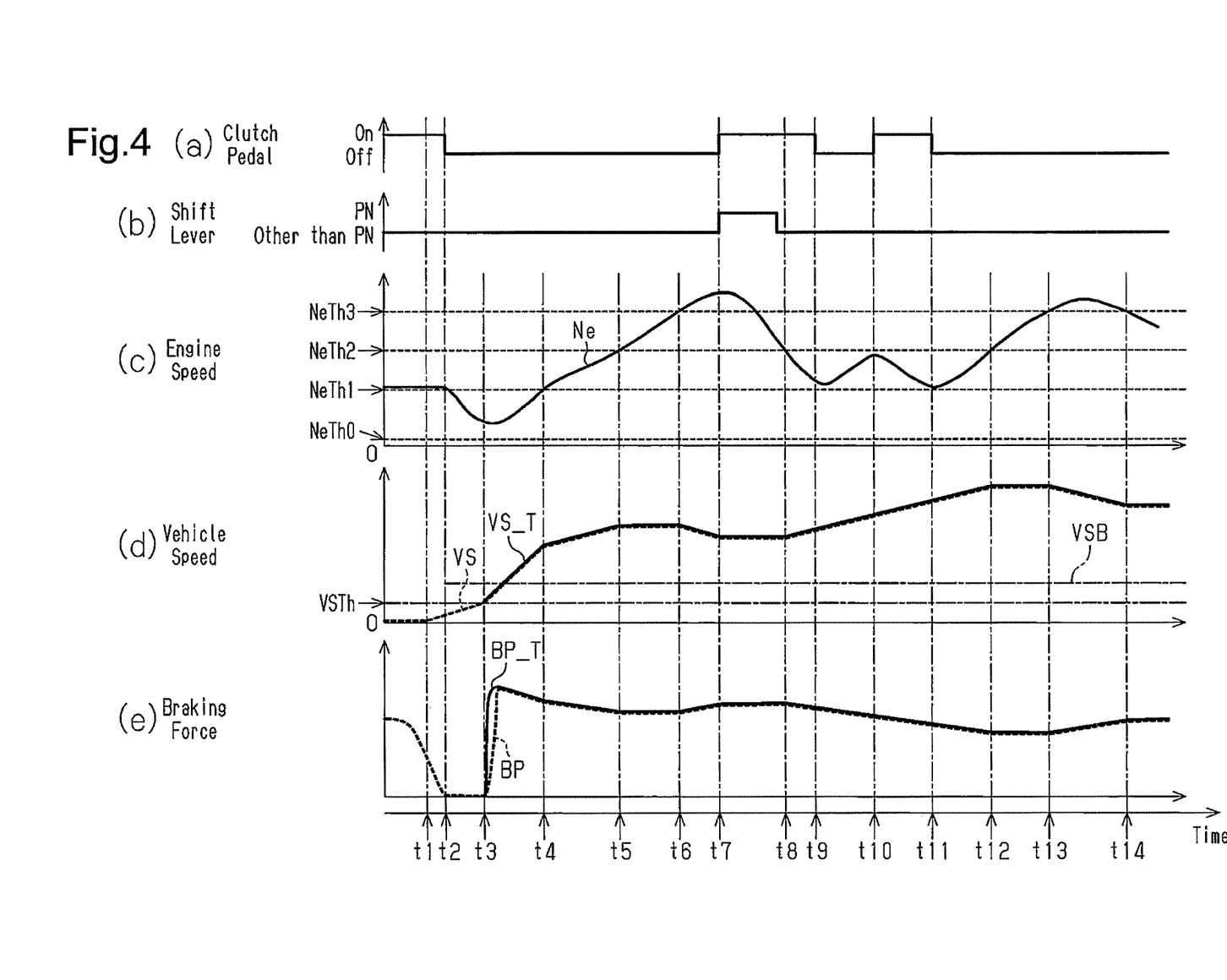
FIG. 4 is a timing diagram illustrating a case in which the driving assistance control is executed after the vehicle equipped with the controller has started, where section (a) illustrates changes in the manner in which the clutch pedal is manipulated, section (b) illustrates changes in the manner in which the shift lever is manipulated, section (c) illustrates changes in the engine speed, section (d) illustrates changes in the vehicle speed, and section (e) illustrates changes in the braking force applied to the vehicle.

As shown in the sections (a), (b), (c), (d), and (e) of FIG. 4, the driver reduces the manipulation amount of the brake pedal 21 while the vehicle is stopped on the descending road, and the vehicle starts at a first point in time t1. At a second point in time t2 after the vehicle has started, the manipulation of the clutch pedal 19 is cancelled. The shift lever 18 is not located at the neutral position PN from before the vehicle is stopped. Thus, the driving force of the engine 12 had not been transmitted to the wheels FL, FR, RL, and RR before the second point in time t2, but the driving force of the engine 12 is transmitted to the wheels FL, FR, RL, and RR from the second point in time t2.

Consequently, the engine 12 and the wheels FL, FR, RL, and RR are drivingly coupled to increase the load applied to the engine 12. Thus, the vehicle speed VS is gradually increased, but the engine speed Ne is decreased. That is, the engine speed Ne is less than the gradient switching speed NeTh1.

At a third point in time t3, if the initiating requirement of the vehicle downhill assist control is satisfied when, for example, the vehicle speed VS becomes greater than or equal to the initiating speed VSTh, execution of the vehicle downhill assist control is started. At the third point in time t3, although the engine speed Ne is greater than or equal to the engine stall determination value Neth0 (step S13: NO), the engine speed Ne is less than the gradient switching speed NeTh1 (step S15: YES). Thus, when the point in time at which the engine speed Ne reaches the gradient switching speed NeTh1 is referred to as a fourth point in time t4, during the period from the third point in time t3 to the fourth point in time t4, the target speed VS_T is increased from the vehicle speed VS at the third point in time t3 by a first gradient (step S16). That is, the target speed VS_T is increased at a relatively early stage.

At the start of the vehicle downhill assist control from the third point in time t3, the target braking force BP_T is rapidly increased. During the period from when the target braking force BP_T is rapidly increased to the fourth point in time t4, the target speed VS_T becomes greater than the vehicle speed VS due to the increase in the target speed VS_T. Thus, the target braking force BP_T is decreased (step S24). Based on the target braking force BP_T, the brake actuator 23 is controlled (step S25). That is, the braking force BP applied to the vehicle is increased to the target braking force BP_T by the operation of the brake actuator 23. If the braking force BP becomes substantially equal to the target braking force BP_T, the braking force BP is decreased in accordance with the decrease in the target braking force BP_T. Consequently, the braking force applied to the wheels FL, FR, RL, and RR is gradually decreased, and the load applied to the engine 12 is gradually decreased. As a result, with the increase in the wheel speed (that is, the speed) of the wheels FL, FR, RL, and RR, the engine speed Ne is gradually increased.

When the engine speed Ne reaches the gradient switching speed NeTh1 at the fourth point in time t4 (step S15: NO), the increasing speed of the target speed VS_T is changed. In the period from the fourth point in time t4 to a fifth point in time t5, although the engine speed Ne is greater than or equal to the gradient switching speed NeTh1 (step S15: NO), the engine speed Ne is less than the safeguard speed NeTh2 (step S17: YES). Thus, in this period, the target speed VS_T is increased from the target speed at the fourth point in time t4 at a second gradient (step S18). That is, the increasing speed of the target speed VS_T is reduced to be less than the increasing speed before the fourth point in time t4.

In the period from the fourth point in time t4 to the fifth point in time t5, the difference obtained by subtracting the vehicle speed VS from the target speed VS_T is unlikely to become greater than the difference before the fourth point in time t4. Thus, the target braking force BP_T is decreased at a gradient less than the gradient before the fourth point in time t4 (step S24). Since the brake actuator 23 is controlled based on the target braking force BP_T, the braking force BP applied to the vehicle is decreased in accordance with the decrease in the target braking force BP_T (step S25). In this case also, since the braking force applied to the wheels FL, FR, RL, and RR is decreased, and the wheel speed is increased, the engine speed Ne is gradually increased. However, since the decreasing speed of the braking force applied to the wheels FL, FR, RL, and RR is reduced from the decreasing speed before the fourth point in time t4, the engine speed Ne is more gently increased than before the fourth point in time t4.

In the example shown in FIG. 4, the vehicle is not brought into the neutral state during the period from the second point in time t2, at which the vehicle downhill assist control is started, to the fifth point in time t5, at which the engine speed Ne reaches the safeguard speed NeTh2. However, depending on the situation, the vehicle may be brought into the neutral state during the period from the second point in time t2 to the fifth point in time t5. In this case also, in the vehicle equipped with the controller 50, which is the driving assistance device of the present embodiment, the target speed VS_T is increased. Thus, the target speed VS_T becomes greater than the vehicle speed VS, and the target braking force BP_T is decreased. That is, in a case in which the engine speed Ne is less than the safeguard speed NeTh2 during execution of the vehicle downhill assist control, the target speed VS_T is increased regardless of whether the vehicle is in the neutral state.

During the period from the fifth point in time t5 to a sixth point in time t6, although the engine speed Ne is greater than or equal to the safeguard speed NeTh2 (step S17: NO), the engine speed Ne is less than the decrease determination speed NeTh3 (step S20: YES). Thus, in this period, the target speed VS_T is maintained at the target speed at the fifth point in time t5 (step S21). This causes the target speed VS_T to be equal to the vehicle speed VS, and consequently the target braking force BP_T is also maintained at the target braking force at the fifth point in time t5 (step S24). Since the brake actuator 23 is controlled based on the target braking force BP_T (step S25), the braking force applied to the wheels FL, FR, RL, and RR is also maintained. As a result, although it is not apparent from FIG. 4, the engine speed Ne is unlikely to be increased compared with the case before the fifth point in time t5.

Although the braking force BP applied to the vehicle is maintained, the engine speed Ne may be increased if the gradient of the descending road on which the vehicle is traveling is great. Thus, in the example shown in FIG. 4, the engine speed Ne is increased even after the fifth point in time t5, and at the subsequent sixth point in time t6, the engine speed Ne becomes greater than or equal to the decrease determination speed NeTh3 (step S20: NO).

In addition, in the period from the sixth point in time t6 to a seventh point in time t7, the neutral state of the vehicle is not detected (step S19: NO). Thus, in this period, the target speed VS_T is decreased from the target speed at the sixth point in time t6 (steps S22 and S23). That is, if the engine speed Ne becomes greater than or equal to the decrease determination speed NeTh3 by maintaining the target speed VS_T, the target speed VS_T is decreased. If the target speed VS_T is decreased toward the reference speed VSB, the target speed VS_T becomes less than the vehicle speed VS. As a result, the target braking force BP_T is increased (step S24), and the brake actuator 23 is controlled based on the target braking force BP_T (step S25). Thus, the braking force BP applied to the vehicle is increased in accordance with the increase in the target braking force BP_T. Since the braking force applied to the wheels FL, FR, RL, and RR is increased, and the load applied to the engine 12 is increased, the engine speed Ne is hindered from being increased. If the braking force applied to the wheels FL, FR, RL, and RR is kept to be increased, the engine speed Ne is decreased.

In a case in which the target speed VS_T is decreased since the engine speed Ne is greater than or equal to the decrease determination speed NeTh3, the target speed VS_T may become equal to the reference speed VSB. In this case, the target speed VS_T is maintained to be equal to the reference speed VSB.

At the seventh point in time t7, at which the engine speed Ne is greater than or equal to the decrease determination speed NeTh3, the vehicle is detected to be in the neutral state if manipulation of both the clutch pedal 19 and the shift lever 18 is started by the driver to change the gear position of the transmission 13. In this case, since the engine speed Ne is greater than or equal to the safeguard speed NeTh2 (step S17: NO) until an eighth point in time t8, upon detection of the vehicle being in the neutral state (step S19: YES), the target speed VS_T is maintained at the target speed at the seventh point in time t7 (step S14). This causes the target speed VS_T to become equal to the vehicle speed VS, and the target braking force BP_T is also maintained at the target braking force at the seventh point in time t7 (step S24). Thus, since the brake actuator 23 is controlled based on the target braking force BP_T (step S25), the braking force applied to the wheels FL, FR, RL, and RR is also maintained.

While the braking force applied to the vehicle is maintained since the vehicle is in the neutral state, the engine speed Ne is decreased toward the idle speed of the engine 12. At the eighth point in time t8, at which the braking force applied to the vehicle is being maintained, the engine speed Ne becomes less than the safeguard speed NeTh2 (step S17: YES). Thus, as shown in FIG. 4, even if the neutral state of the vehicle is continued to a ninth point in time t9, the target speed VS_T is increased at the second gradient from the eighth point in time t8 (step S18). This causes the target speed VS_T to exceed the vehicle speed VS. As a result, the target braking force BP_T is decreased (step S24), and the brake actuator 23 is controlled based on the target braking force BP_T (step S25). Thus, the braking force BP applied to the vehicle is decreased in accordance with the decrease in the target braking force BP_T.

Subsequently, during the period from a tenth point in time t10 to an eleventh point in time t11, the clutch pedal 19 is manipulated by the driver, and the vehicle is brought into the neutral state. However, in this period, since the engine speed Ne is less than the safeguard speed NeTh2 (step S17: YES), the increase in the target speed VS_T at the second gradient is continued (step S18). As a result, the state in which the target speed VS_T is greater than the vehicle speed VS is continued, and the target braking force BP_T is continued to be decreased (step S24). Since the brake actuator 23 is controlled based on the target braking force BP_T, the braking force BP applied to the vehicle is also continued to be decreased (step S25).

If the engine speed Ne is increased by reducing the braking force applied to the wheels FL, FR, RL, and RR, the engine speed Ne becomes greater than or equal to the safeguard speed NeTh2 at a twelfth point in time t12 (step S17: NO). Since the engine speed Ne is less than the decrease determination speed NeTh3 (step S20: YES) during the period from the twelfth point in time t12 to a thirteenth point in time t13, the target speed VS_T is maintained (step S21). This causes the target speed VS_T to become equal to the vehicle speed VS, and the target braking force BP_T is maintained (step S24). The brake actuator 23 is controlled based on the target braking force BP_T (step S25).

In a state in which the target braking force BP_T is maintained, the target speed VS_T is decreased if the engine speed Ne reaches the decrease determination speed NeTh3 at the thirteenth point in time t13 (step S20: NO) (steps S22 and S23). This causes the target speed VS_T to become less than the vehicle speed VS, and the target braking force BP_T is increased (step S24). The brake actuator 23 is controlled based on the target braking force BP_T (step S25).

If the braking force applied to the wheels FL, FR, RL, and RR is increased, the engine speed Ne is decreased, and the engine speed Ne becomes less than the decrease determination speed NeTh3 at a fourteenth point in time t14 (step S20: YES). Thus, the target speed VS_T is maintained (step S21). If the target speed VS_T becomes equal to the vehicle speed VS, the target braking force BP_T is maintained (step S24), and the brake actuator 23 is controlled based on the target braking force BP_T (step S25).

The above-described configuration and operation have the following advantages.

(1) In the condition in which the braking force is being applied to the wheels FL, FR, RL, and RR through the execution of the vehicle downhill assist control, the target speed VS_T is increased if the engine speed Ne is less than the safeguard speed NeTh2. If the target speed VS_T becomes greater than the vehicle speed VS, the braking force applied to the wheels FL, FR, RL, and RR is reduced such that the vehicle speed VS approaches the target speed VS_T. Thus, the load applied to the engine 12 is reduced, and the engine speed Ne is increased. This configuration restrains a decrease in the engine speed Ne when the braking force is being applied to the wheels FL, FR, RL, and RR through the execution of the vehicle downhill assist control.

(2) If the engine speed Ne is less than the gradient switching speed NeTh1 during execution of the vehicle downhill assist control, it is determined that the engine speed Ne is extremely low, and the target speed VS_T is increased at an early stage. Thus, the difference obtained by subtracting the vehicle speed VS from the target speed VS_T is likely to be increased, and the braking force applied to the wheels FL, FR, RL, and RR is promptly decreased. Thus, the engine speed Ne is increased at an early stage, and the engine speed Ne is unlikely to be extremely low. If the engine speed Ne is greater than or equal to the gradient switching speed NeTh1 and less than the safeguard speed NeTh2, it is determined that the engine speed Ne is relatively high. Thus, the target speed VS_T is gently increased. In this case, the difference obtained by subtracting the vehicle speed VS from the target speed VS_T is unlikely to be increased, and the braking force applied to the wheels FL, FR, RL, and RR is gently decreased. Thus, the vehicle speed VS is restrained from being excessively high during execution of the vehicle downhill assist control. This configuration restrains the decrease in the engine speed Ne and the excessive increase in the vehicle speed VS during execution of the vehicle downhill assist control.

(3) If the engine speed Ne becomes greater than or equal to the safeguard speed NeTh2 during execution of the vehicle downhill assist control, the target speed VS_T is maintained. This causes the target speed VS_T to become equal to the vehicle speed VS, and the braking force applied to the vehicle is maintained. Thus, the vehicle speed VS is prevented from being unnecessarily increased during execution of the vehicle downhill assist control.

(4) A case will be used a comparative example in which the safeguard speed NeTh2 is set to a value less than the idle speed of the engine 12 when the idle-up process is being executed. In this comparative example, when the engine 12 is operated to execute the idle-up process in the condition in which the vehicle downhill assist control is being executed, the engine speed Ne may become greater than or equal to the safeguard speed NeTh2, and the braking force applied to the vehicle may stop being decreased. In this case, since the braking force applied to the wheels FL, FR, RL, and RR is not decreased, the engine speed Ne is unlikely to be increased. That is, from the viewpoint of the engine 12, the increase in the engine speed Ne is hindered by the brake system 20. In this case, the noise from the engine 12 may possibly be increased, causing an occupant of the vehicle to feel uncomfortable, and the amount of fuel consumed by the engine 12 to execute the idle-up process may possibly be increased.

From the viewpoint of the brake system 20, although the braking force BP is increased to decrease the vehicle speed VS, the engine speed Ne is increased. Thus, the vehicle speed VS is hard to be decreased. That is, the vehicle downhill assist control is hindered by the engine 12. In this case, the braking force applied to the vehicle may become excessive, and the brake mechanisms 25a to 25d mounted on the wheels FL, FR, RL, and RR may possibly be heated.

In contrast, in the controller 50, which is the driving assistance device of the present embodiment, the safeguard speed NeTh2 is set to a value greater than the idle speed of the engine 12 when the idle-up process is being executed. Thus, when the engine 12 is operated to execute the idle-up process in the condition in which the vehicle downhill assist control is being executed, the engine speed Ne is less likely to become greater than or equal to the safeguard speed NeTh2 compared with the case of the comparative example. For this reason, the idle-up process for the engine 12 can be executed in the condition in which the braking force applied to the wheels FL, FR, RL, and RR is decreased. In this case, the engine speed Ne is easily increased compared with the above-described comparative example, in which the braking force BP applied to the vehicle is not decreased. Thus, the vehicle driving assistance device of the present embodiment prevents the vehicle downhill assist control (brake control) and the engine control from hampering each other. This limits the increase in the noise from the engine 12 caused by executing the vehicle downhill assist control, excessive temperature increase in the brake mechanisms 25a to 25d, and the deterioration of the fuel efficiency of the engine 12.

(5) Furthermore, during execution of the vehicle downhill assist control, if the engine speed Ne becomes greater than or equal to the decrease determination speed NeTh3, the target speed VS_T is decreased toward the reference speed VSB. Thus, the target speed VS_T becomes less than the vehicle speed VS. As a result, the braking force applied to the vehicle is increased, and the vehicle speed VS is gradually decreased. That is, the vehicle speed VS is allowed to approach the reference speed VSB within a range in which the engine speed Ne is not extremely reduced.

(6) In the case in which the engine speed Ne is greater than or equal to the safeguard speed NeTh2, the engine speed Ne is relatively high although the braking force BP applied to the vehicle is not decreased. Thus, in the case in which the engine speed Ne is greater than or equal to the safeguard speed NeTh2 during execution of the vehicle downhill assist control, the target speed VS_T is maintained if the vehicle is detected to be in the neutral state. This causes the target speed VS_T to become equal to the vehicle speed VS, and the braking force BP applied to the vehicle is maintained. As a result, the vehicle speed VS is unlikely to fluctuate. Thus, while the vehicle is in the neutral state, the driver is allowed to calmly perform the operation such as the operation for changing the gear position of the transmission 13.

(7) In the controller 50, which is the driving assistance device of the present embodiment, the vehicle is detected to be in the neutral state based on the detection result of the shift position sensor SE2 and the clutch sensor SE3. Thus, if a malfunction or a failure of the sensors SE2 and SE3 occurs, the vehicle may be detected to be in the neutral state although the vehicle is not actually in the neutral state.

Given these factors, if it is detected that the vehicle is in the neutral state, the target speed VS_T is maintained even in the condition in which the engine speed Ne is less than the safeguard speed NeTh2. In this case, if the target speed VS_T is maintained due to the erroneous detection of the neutral state in the condition in which the engine speed Ne is less than the safeguard speed NeTh2, the target speed VS_T becomes equal to the vehicle speed VS, and the braking force BP applied to the vehicle stops being decreased. As described above, if the braking force BP is not decreased, the engine speed Ne may possibly be decreased.

In contrast, in the controller 50, which is the driving assistance device of the present embodiment, the target speed VS_T is increased regardless of whether the vehicle is in the neutral state in the condition in which the engine speed Ne is less than the safeguard speed NeTh2. This causes the target speed VS_T to become greater than the vehicle speed VS, and the braking force BP applied to the vehicle is decreased. Thus, even if the vehicle downhill assist control is executed in the condition in which a malfunction or a failure of the shift position sensor SE2 and the clutch sensor SE3 is occurring, the engine speed Ne is restrained from being decreased, and the engine speed Ne is restrained from being extremely low.

(8) The transmission 13 of the present vehicle is a manual transmission. Thus, depending on the manner in which the driver manipulates the vehicle during the execution of the vehicle downhill assist control, engine stall may occur. For example, engine stall may occur by a mistake in the manipulation of the vehicle performed by the driver. In the controller 50, which is the driving assistance device of the present embodiment, if engine stall occurs during execution of the vehicle downhill assist control, the target speed VS_T is maintained regardless of the level of the engine speed Ne at that time. This causes the target speed VS_T to become equal to the vehicle speed VS, and the braking force BP applied to the vehicle is maintained. If the braking force BP is maintained, the vehicle speed VS is not increased, and the driver is allowed to calmly perform the manipulation for starting the engine 12.

The above illustrated embodiment may be modified as follows.

If engine stall occurs during execution of the vehicle downhill assist control, the braking force applied to the vehicle may be increased to stop the vehicle. The driver is allowed to calmly perform the manipulation of the vehicle to start the engine by maintaining the vehicle to be stopped.

The engine ECU 51 determines whether engine stall has occurred. Thus, if the brake ECU 53 receives information indicating that engine stall has occurred from the engine ECU 51 during execution of the vehicle downhill assist control, the braking force BP applied to the vehicle may be maintained, or the vehicle may be stopped by increasing the braking force BP.

In some cases it cannot be ensured that the sensor used for detecting that the vehicle is in the neutral state is properly operating for sure. In such a case, the target speed VS_T may be maintained even if the engine speed Ne is less than the safeguard speed NeTh2 during execution of the vehicle downhill assist control.

If the engine speed Ne is greater than or equal to the decrease determination speed NeTh3 during execution of the vehicle downhill assist control, the target speed VS_T may be decreased regardless of whether the vehicle is in the neutral state.

Whether to decrease the target speed VS_T when the engine speed Ne is greater than or equal to the decrease determination speed NeTh3 during execution of the vehicle downhill assist control may be determined in accordance with the state of the vehicle.

For example, the vehicle may be a vehicle with a sub-transmission. The sub-transmission is a decelerator that switches the driving force output from the transmission 13 in two ranges and allows for selection between H4 or L4. The gear position selected during normal traveling is H4, and the gear position selected to increase the driving force of the vehicle when the vehicle is traveling on a steep descending road or a bad road is L4. That is, if H4 is selected as the gear position of the sub-transmission, the vehicle speed VS may be relatively high. If L4 is selected as the gear position of the sub-transmission, it is not desirable for the vehicle speed VS to be excessively high. If the vehicle downhill assist control is executed in the condition in which the gear position of the sub-transmission is in H4, the target speed VS_T may be maintained although the engine speed Ne may be greater than or equal to the decrease determination speed NeTh3. In a case in which the vehicle downhill assist control is executed in the condition in which the gear position of the sub-transmission is in L4, the target speed VS_T may be decreased if the engine speed Ne is greater than or equal to the decrease determination speed NeTh3.

If the vehicle is traveling on a bad road or a steep descending road, it is not desirable for the vehicle speed VS to be excessively high. In a case in which the vehicle is traveling on a road surface that is not a bad road or a steep descending road, the vehicle speed VS may be relatively high. For this reason, when the vehicle downhill assist control is executed in the condition in which the vehicle is traveling on a road surface that is not a bad road or a steep descending road, the target speed VS_T may be maintained although the engine speed Ne is greater than or equal to the decrease determination speed NeTh3. When the vehicle downhill assist control is executed in the condition in which the vehicle is traveling on a bad road or a steep descending road, the target speed VS_T may be decreased if the engine speed Ne is greater than or equal to the decrease determination speed NeTh3.

If the engine speed Ne is greater than or equal to the safeguard speed NeTh2 during execution of the vehicle downhill assist control, the target speed VS_T may be increased at a third gradient that is less than the second gradient.

The safeguard speed NeTh2 may be set to any value as long as the safeguard speed NeTh2 is greater than the idle speed of the engine 12 when the idle-up process is not being executed.

The gradient switching speed NeTh1 may be set to any value as long as the engine speed Ne does not become extremely low if the engine speed Ne is greater than or equal to the gradient switching speed NeTh1.

The gradient switching speed NeTh1 does not necessarily have to be provided. In this case, if the engine speed Ne is less than the safeguard speed NeTh2 during execution of the vehicle downhill assist control, the target speed VS_T is increased at a constant gradient until the engine speed Ne reaches the safeguard speed NeTh2. The increase gradient of the target speed VS_T at this time is preferably set to a gradient that is greater than the above-described second gradient.

If the gradient switching speed NeTh1 is not provided, the increase gradient of the target speed VS_T when the engine speed Ne is less than the safeguard speed NeTh2 during execution of the vehicle downhill assist control may be changeable. For example, as the engine speed Ne approaches the safeguard speed NeTh2, the increase gradient of the target speed VS_T may be gradually decreased.

The vehicle equipped with the vehicle driving assistance device may be a vehicle other than the vehicle including the manual transmission as long as the vehicle does not include a torque converter on the power transmission path from the engine 12 to the wheels FL, FR, RL, and RR. In such a vehicle, the engine speed Ne may be extremely reduced by applying the braking force BP to the vehicle in accordance with the execution of the vehicle downhill assist control. Thus, the advantage equivalent to the above-described advantage (1) is obtained by providing the driving assistance device on the vehicle.

The invention claimed is:

1. A vehicle driving assistance device comprising:
a braking controller, which executes a driving assistance control, in the driving assistance control:

if a vehicle speed is greater than a target speed, the braking controller increases braking force applied to a vehicle, and if the vehicle speed is less than the target speed, the braking controller decreases the braking force applied to the vehicle; and a target speed setting section configured to increase the target speed if an engine speed is less than a safeguard speed during execution of the driving assistance control by the braking controller.

2. The vehicle driving assistance device according to claim 1, wherein a determination value that is less than the safeguard speed is set to a gradient switching speed, if the engine speed is less than the gradient switching speed during execution of the driving assistance control by the braking controller, the target speed setting section increases the target speed at a first gradient, and if the engine speed is greater than or equal to the gradient switching speed and less than the safeguard speed during execution of the driving assistance control by the braking controller, the target speed setting section increases the target speed by a second gradient, which is less than the first gradient.

3. The vehicle driving assistance device according to claim 1, wherein, if the engine speed is greater than or equal to the safeguard speed during execution of the driving assistance control by the braking controller, the target speed setting section maintains the target speed.

4. The vehicle driving assistance device according to claim 3, wherein a determination value greater than the safeguard speed is set to a decrease determination speed, and if the engine speed is greater than or equal to the decrease determination speed during execution of the driving assistance control by the braking controller, the target speed setting section decreases the target speed toward a reference speed.

5. The vehicle driving assistance device according to claim 4, wherein a state in which driving force is not transmitted from an engine of a vehicle to wheels during operation of the engine is defined as a neutral state, if the neutral state is detected when the engine speed is greater than or equal to the safeguard speed during execution of the driving assistance control by the braking controller, the target speed setting section maintains the target speed.

6. The vehicle driving assistance device according to claim 5, wherein, if the engine speed is less than the safeguard speed during execution of the driving assistance control by the braking controller, the target speed setting section increases the target speed regardless of whether the vehicle is in the neutral state.

7. The vehicle driving assistance device according to claim 1, wherein, if engine stall occurs during execution of the driving assistance control by the braking controller, the target speed setting section maintains the target speed.

* * * * *